Oct. 22, 1935.   W. V. HOWARD   2,017,971
HAY PRESS FEEDER
Filed Feb. 24, 1932   3 Sheets-Sheet 1
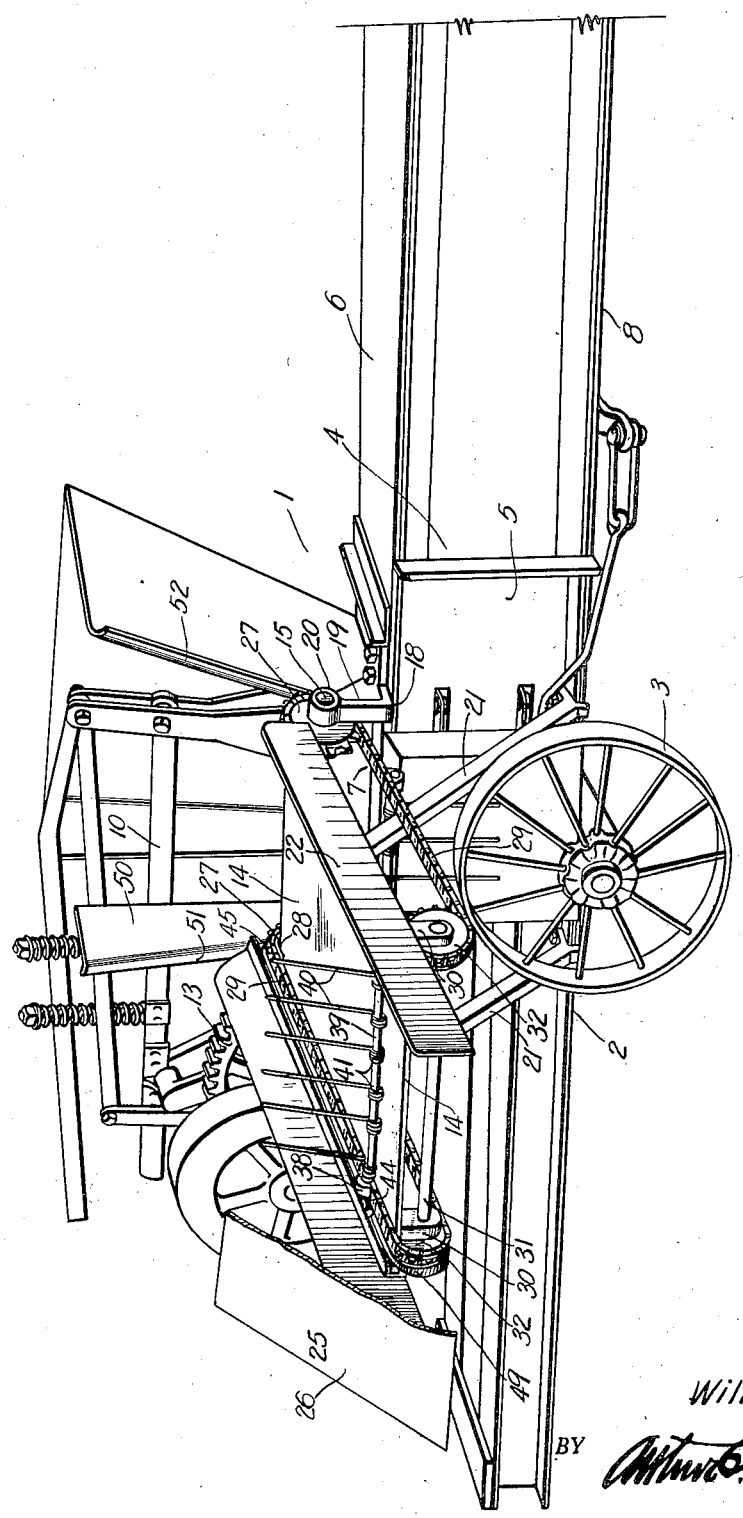
INVENTOR.
Willis V. Howard
BY
ATTORNEY.

Oct. 22, 1935.  W. V. HOWARD  2,017,971
HAY PRESS FEEDER
Filed Feb. 24, 1932  3 Sheets-Sheet 2
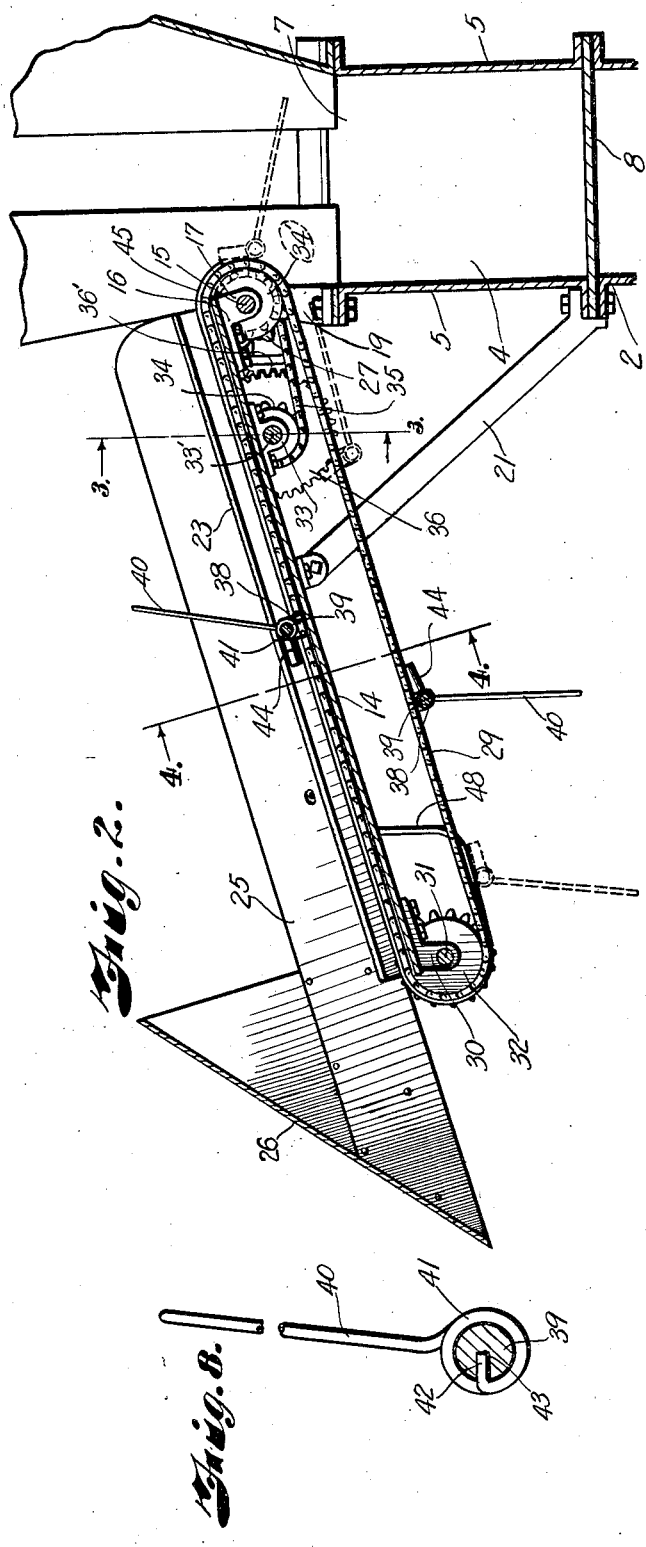
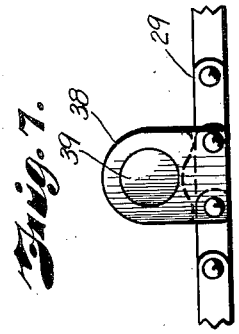
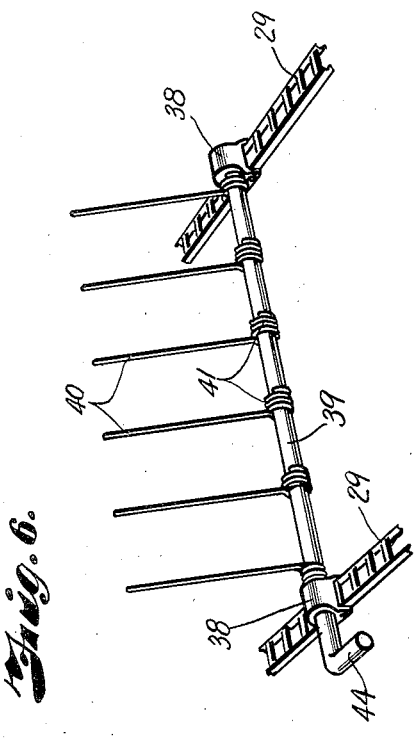
INVENTOR.
Willis V. Howard
BY
ATTORNEY.

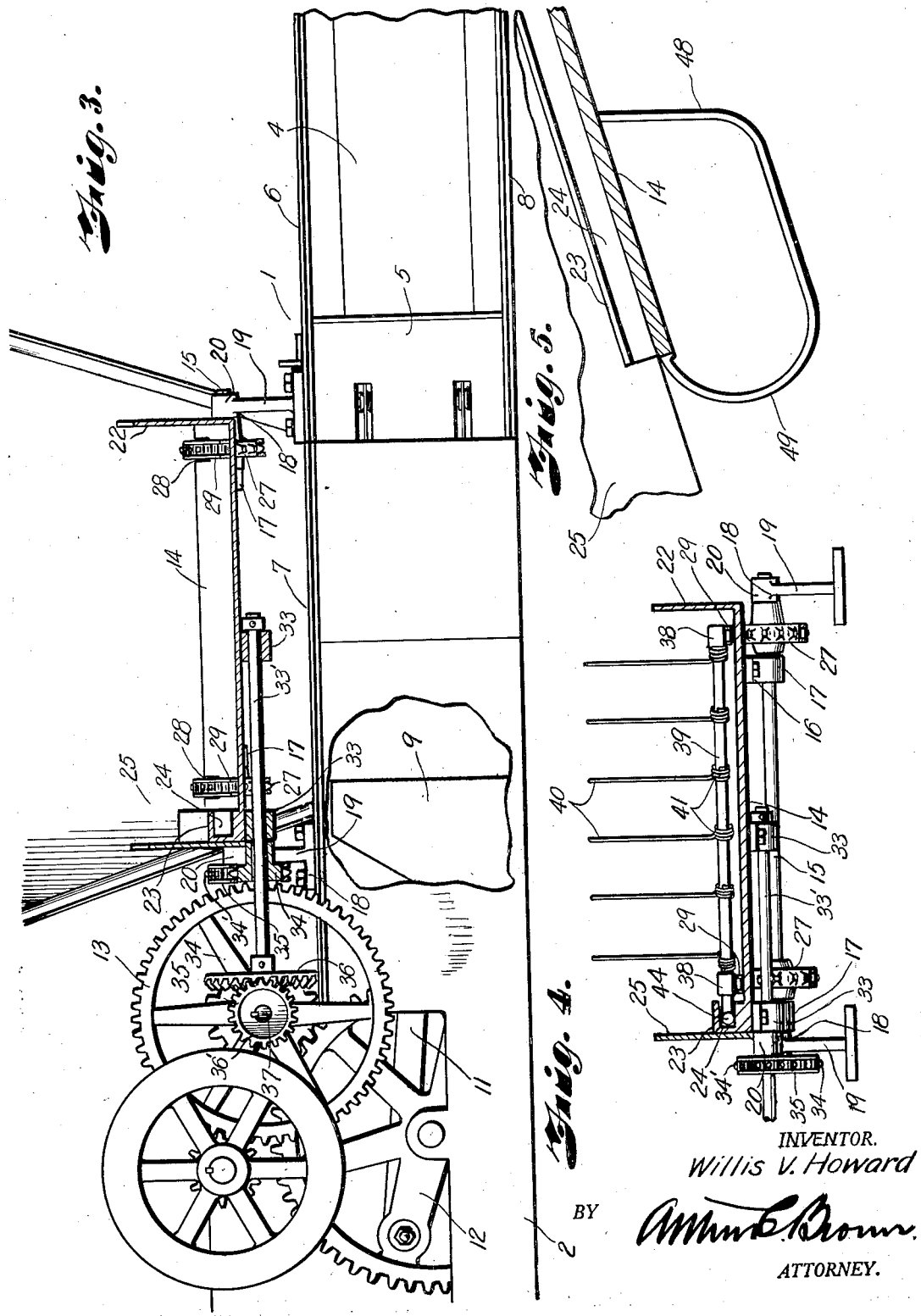

Patented Oct. 22, 1935

2,017,971

UNITED STATES PATENT OFFICE 2,017,971

HAY PRESS FEEDER

Willis V. Howard, Leavenworth, Kans.

Application February 24, 1932, Serial No. 594,772

1 Claim. (Cl. 198—168)

My invention relates to hay presses and like apparatus including a baling chamber and a plunger operating in the chamber to press material therein, and more particularly to feeders for delivering material to the baling chambers of a hay press.

Under present practice, a hopper is mounted at the inlet opening of a baling chamber. An operator forks loose hay into the hopper while the plunger is in retracted position, for supplying a suitable charge of hay to the baling chamber, and the hay may then be folded and pressed through the hopper into the baling chamber by a feeder arm, the plunger then operating to compress the charge. The operator must wait until the feeder arm and plunger are again in retracted position before delivering hay to the hopper, and the movements of the feeder arm and plunger must be timed to give the operator sufficient opportunity to supply the suitable charge, the operator's work thus being delayed during the pressing movement of the plunger, and the pressing movement of the plunger being delayed to permit the operator to supply the charge. The operator cannot observe the condition and volume of the mass of hay in the chamber and hopper while the charge is accumulating, and relatively wide variations in the weights of bales are therefore liable to occur.

The principal objects of my invention therefore are to enable an operator to continue supplying material for a charge while the plunger is operating in a press of this character, and to insure relative equality of the volume of charges, whereby the labor and time consumed in operating a press may be reduced, economy in the use of equipment will be promoted, and the quality of the product will be improved.

In accomplishing these and other objects of the invention, I have provided improved details of structure, the preferred form of which is illustrated in the accompanying drawings, wherein:

Fig. 1 is a perspective view of a portion of a hay press equipped with my improved supplementary feeding device.

Fig. 2 is a sectional view including a transverse section through the press and a longitudinal section through the device.

Fig. 3 is a section on the line 3—3, Fig. 2, a baling chamber wall being partly broken away to show a plunger in retracted position.

Fig. 4 is a section on the line 4—4, Fig. 2.

Fig. 5 is a fragmentary section of the outer end of the device illustrating guide members for controlling the position of material-moving teeth.

Fig. 6 is a perspective view of a feeder bar including endless chains shown fragmentarily.

Fig. 7 is a side elevation of a portion of a chain including a carrier link supporting one end of a feeder bar.

Fig. 8 is a section of the feeder bar, illustrating means for fixing a tooth thereto.

Referring in detail to the drawings:

I designates generally a hay press or baling machine supported by a frame 2 on wheels 3 and including a baling chamber 4 having side walls 5, a top wall 6 provided with an inlet opening 7, and a bottom or base 8. A plunger 9 sliding on the base includes a head having a face area substantially equal to the cross section of the chamber reciprocable therein to press materials supplied to the chamber through the inlet opening 7.

The press may include feeding mechanisms including a vertically moving frame 10 operating to press material into the baling chamber while the plunger is retracted, and being retracted to elevated position to permit the plunger to act. The plunger and feeder are operated by means including a pitman 11 pivoted to a drive wheel 12 and an intermediate gear 13 actuated from a suitable source of power.

In ordinary apparatus of the character referred to, a hopper is mounted at the inlet of the chamber into which hay is piled for delivery to the chamber by the feeder when the plunger is in the retracted position illustrated in Fig. 3.

My invention includes a feeding platform or conveyor table 14 extending laterally from the press and pivotally mounted on a shaft 15, a boxing or bracket 16 fixed to the under surface of the inner end of the platform having depending ears 17 provided with bearing apertures to receive the shaft, and boxings 18 attached to the body of the press by brackets 19 having apertured upwardly extending journal bearing portions 20 to receive the shaft. The platform is thus pivotally mounted on the press and is provided with pivotal legs 21 engageable with the lower flange of the frame 2 to which they may be attached by bolts or other suitable fastening means for supporting the outer free end of the platform at a desired elevation. The inner end of the platform is located slightly above the chamber inlet and adjacent one side thereof.

The platform comprises preferably a metal plate or sheet having one edge bent upwardly to form a side rail 22 and the other edge bent upwardly and then inwardly parallel with the body of the platform to form the upper wall 23 of a guide channel 24 and is fitted with a guide rail 25. The ends of the rails preferably extend outwardly beyond the outer end edge of the platform and are connected by a hood member 26 for reenforcing and stabilizing the rails and preventing displacement of material from the outer end of the table. The shaft 15 thus extends transversely beneath the platform and pivotally supports the inner end thereof adjacent the inlet to the baling chamber.

Mounted on the shaft 15 are sprockets 27 rotatable in slots 28 in the platform, the shaft being located near the end of the platform to permit endless chains 29 carried by the sprockets to pass over said end. Bearings 30 fixed to the outer end of the platform support a shaft 31 on which sprockets 32 are mounted for supporting the outer ends of the chain belts 29.

Mounted in bearings 33 beneath the platform and adjacent the shaft 15 is a drive shaft 33' extending laterally from the platform and fitted with a sprocket 34 operably connected with a sprocket 34' on the shaft 15 by a chain belt 35. Fixed on the outer end of the shaft 33' is a miter gear 36 adapted to mesh with a miter gear 36' when the platform is in operating position.

The miter gear 36' is keyed on a stub shaft 37 fixed to the intermediate gear 13 of the press whereby the actuating mechanism of the press may effect rotation of the shafts 33', 15 and 31 to move the chains 29, the upper runs of the chains moving over the top of the platform and the lower runs beneath the platform.

The chains comprise link belts and each chain includes paired carrier links 38 journaling spaced pivot bars 39. Fingers 40 comprising preferably a plurality of spring wire teeth are fixed to the shaft and preferably include portions 41 coiled around the shaft and tips 42 bent for insertion in sockets 43 in the shaft whereby the teeth are keyed to the shaft against rotation thereon.

Movement of the chains will therefore move the shaft and teeth over the platform toward the inlet of the pressing chamber to shift material from the platform into the chamber, the teeth then returning to the outer end of the platform for successive material moving operations over the platform.

In order to control the position of the teeth to shift material over the platform and into the chamber, a guide lug or tilting ear 44 is formed on one end of the shaft preferably comprising an end of the shaft bent at right angles to the axis thereof and adapted to run in the guide channel 24, the wall 23 being spaced sufficiently from the platform to retain the lug in horizontal position and thereby maintain the spring teeth in substantially upright position while passing over the top of the platform as clearly shown in Figs. 2 and 4.

In order to tilt the spring teeth at the inner end of the platform for pressing material downwardly into the baling chamber, the inner end of the guide channel is extended arcuately downwardly by provision of a curved strip 45 forming a continuation of the edge portion of the platform comprising the bottom of the channel, and having a curvature conforming to the arc over which the axis of the shaft 39 moves.

The depending arcuate guide strip is limited in length to permit the guide lug to leave the same after the teeth have reached the upper edge of the baling chamber and permit the teeth to assume a horizontal position as illustrated in Fig. 2 for translation beneath the platform to the outer end thereof.

A guide strip 48 comprising a strip having a portion extending in parallel and spaced relation with the outer portions of the platform forms a guide to engage and control the position of the lug and cause the teeth to extend at right angles to the plane of the chains, the member being extended arcuately upwardly to form a track 49 on which the lug moves to cause the teeth to extend outwardly from the curved path of the chain, and thus position the teeth for upright movement along the platform.

I further preferably provide a shield or baffle member 50 including a wing 51 extending slantingly upwardly from the front end of the chamber inlet and a wing 52 on the edge of the inlet opposite to the platform for guiding material delivered by the spring teeth into the chamber inlet.

In using apparatus constructed as described, the movement of the chains and teeth along the platform will be synchronized with the movements of the feeder and plunger whereby the teeth will shift material along the platform for delivery into the bale chamber while the feeder and plunger are in retracted position, and the feeder and plunger will operate in succession after the teeth have left the chamber area.

An operator may therefore pile hay on the platform behind the moving teeth and while the teeth are moving in the portion of their path beneath the platform, and during the periods of operation of the feeder and plunger.

A measured and easily estimated quantity of hay may thus be piled on the platform to comprise a charge for delivery to the baling chamber.

When the teeth move to the top of the platform and therealong, they shift the mass of hay thereon toward the inner end of the platform and therefrom into the chamber.

When the measured mass of hay has been moved into the chamber, the teeth further move downwardly against the top of the mass and tend to press the same into the chamber, to locate the hay for action thereon by the feeder, the pressing effect being enhanced due to anchoring of the teeth against rotation by the lug on the tooth-supporting shaft and the arcuate guide strip 45.

The device thus forms an automatic feed table, whereby one operator may easily supply accurately measured quantities of hay to comprise charges and may continue to supply hay to the platform substantially without interruption, since he is not required to press hay downwardly in the hopper into position to be acted on by the feeder, or to wait for the feeder and plunger to operate.

What I claim and desire to secure by Letters Patent is:

In combination with a baling chamber having an inlet for the insertion of material to be baled, a platform on which the material is forked preparatory for movement to the baling chamber, means supporting the platform with the delivery end thereof in discharging relation with said inlet, rakes movable across the platform in spaced relation with each other so that when one rake is moving the material off the platform, another rake is moving into position at the other end of the platform preparatory to movement of material forked on the platform back of the first rake, side rails extending longitudinally of the sides of the platform and having ends projecting beyond the end of the platform opposite to said delivery end and having inclined end portions, and a hood fixed to said inclined ends including an inclined guard member extending upwardly in the direction of the table for preventing the rake that is moving into position from interfering with forking of material onto the platform, and means for operating the rakes.

WILLIS V. HOWARD.